United States Patent
Coile et al.

(10) Patent No.: US 6,894,981 B1
(45) Date of Patent: *May 17, 2005

(54) METHOD AND APPARATUS FOR TRANSPARENTLY PROXYING A CONNECTION

(75) Inventors: Brantley W. Coile, Athens, GA (US); Richard A. Howes, Roswell, GA (US); William M. LeBlanc, Athens, GA (US)

(73) Assignee: Cisco Technology, Inc., San Jose, CA (US)

( * ) Notice: Subject to any disclaimer, the term of this patent is extended or adjusted under 35 U.S.C. 154(b) by 496 days.

This patent is subject to a terminal disclaimer.

(21) Appl. No.: 10/027,227

(22) Filed: Dec. 20, 2001

Related U.S. Application Data

(63) Continuation of application No. 08/903,823, filed on Jul. 31, 1997, now Pat. No. 6,006,268.

(51) Int. Cl.[7] .................. H04L 1/00; H04L 12/26; H04J 1/16; G06F 11/00; G08C 15/00
(52) U.S. Cl. .............. 370/248; 370/217; 370/222; 370/401; 709/203; 709/227
(58) Field of Search ................... 370/217, 222, 370/221, 219, 248, 355, 401, 403, 216, 218, 908, 909; 709/225, 227, 230, 203, 219, 224, 228; 714/2, 3, 4; 340/825.01, 825.52; 713/201, 202, 200

(56) References Cited

U.S. PATENT DOCUMENTS

| | | | | |
|---|---|---|---|---|
| 5,319,712 | A | | 6/1994 | Finkelstein et al. ........... 380/44 |
| 5,592,611 | A | | 1/1997 | Midgely et al. ....... 395/182.02 |
| 5,623,601 | A | * | 4/1997 | Vu ............................ 713/201 |
| 5,778,174 | A | | 7/1998 | Cain ..................... 395/187.01 |
| 5,781,550 | A | | 7/1998 | Templin et al. ............. 370/401 |
| 5,802,320 | A | | 9/1998 | Baehr et al. ........... 395/200.79 |
| 5,826,014 | A | * | 10/1998 | Coley et al. ................ 713/201 |
| 5,828,846 | A | | 10/1998 | Kirby et al. ........... 395/200.68 |
| 5,915,087 | A | * | 6/1999 | Hammond .................. 713/201 |
| 6,003,084 | A | * | 12/1999 | Green et al. ................ 709/227 |
| 6,006,268 | A | * | 12/1999 | Coile et al. ................. 709/227 |
| 6,104,716 | A | * | 8/2000 | Crichton et al. ............ 370/401 |
| 6,108,300 | A | * | 8/2000 | Coile et al. ................. 370/217 |
| 6,473,406 | B1 | * | 10/2002 | Coile et al. ................. 370/248 |

* cited by examiner

*Primary Examiner*—Man Phan
(74) *Attorney, Agent, or Firm*—Baker Botts L.L.P.

(57) ABSTRACT

A system and method are disclosed for transparently proxying a connection to a protected machine. The method includes monitoring a communication packet on a network at a proxy machine. The communication packet has a communication packet source address, a communication packet source port number, a communication packet destination address, and a communication packet destination port number. The proxy determines whether to intercept the communication packet based on whether the communication packet destination address and the communication packet destination port number correspond to a protected destination address and a protected destination port number stored in a proxy list. The proxy then determines whether to proxy a proxied connection associated with the communication packet based on the communication packet source address and the communication packet source port number. A protected connection is terminated from the proxy machine to a protected machine. The protected machine corresponds to the communication packet destination address and the communication packet destination port number. A response is formed to the communication packet under a network protocol by sending a responsive packet from the proxy machine. The responsive packet has a header having a responsive packet source address and a responsive packet source port number such that the responsive packet source address and the responsive packet source port number are the same as to the communication packet destination source address and the communication packet destination port number.

48 Claims, 8 Drawing Sheets

METHOD AND APPARATUS FOR TRANSPARENTLY PROXYING A CONNECTION

CROSS REFERENCE TO RELATED APPLICATIONS

This application is related to co-pending application Ser. No. 08/903,823, entitled Method and Apparatus for Reducing Overhead on a Proxied Connection, filed Jul. 31, 1997, now U.S. Pat. No. 6,006,268 issued on Dec. 21, 1999, which is incorporated herein by reference for all purposes.

BACKGROUND OF THE INVENTION

1. Field of the Invention

The present invention relates generally to methods and apparatuses for transparently proxying a connection. More specifically, the invention relates to methods and apparatuses for intercepting packets or datagrams from a client bound for a server and establishing a client connection with the client. A server connection is also established with the server and data is passed to and from the client and the server via the two connections.

2. Description of the Related Art

Proxies

In many network applications, it is often desirable or necessary to prevent a user from making a connection to a first machine at one IP address that has information that the user needs and instead service an information request with a second machine at a different IP address. For example, it is often desired from a security standpoint not to allow connections from potentially hostile machines to a machine that stores sensitive information. Instead, it may be required that a connection first be made to a proxy which itself has various security features such as user authentication and possibly encryption.

The user requests the information from the proxy and the proxy establishes a connection with the machine that is being protected and obtains the information. If the protected machine determines that the user is authorized to receive the information, the proxy can then relay the information to the user that requested it. The proxy thus stands in for the machine that stores the sensitive information and prevents outside users from connecting directly to the protected machine. Instead, the user must first request the information from the proxy and only the proxy connects with the protected machine. The protected machine is insulated from contact with potentially dangerous outside contact.

In a proxy arrangement that is used for security, the proxy generally first identifies and authenticates the user who is requesting information from a machine at a target IP address. In the discussion that follows, the user requesting information will be referred to as the client and the protected machine that is providing information will be referred to as the server. It should be noted that in certain situations the client and server designations may be reversed. The machine that is protected (in the example above, the server) is also referred to as the proxied machine at the proxied address. In some applications, the proxied machine is also referred to as the target machine at the target address because it is the machine that the client or user actually intends to access and from which the user expects to obtain data or some other service.

The target machine is distinguished from the proxy because the user does not generally desire to retrieve information from or contact the proxy other than for the purpose of authenticating himself or otherwise preparing for the desired connection with the target machine. The machine that acts as a proxy is called the proxy machine at the proxy address. The user making the connection is referred to as the user or the client. When a proxy is used, the user connects to the proxy machine at the proxy IP address and never actually makes a connection to the proxied machine at the proxied IP address.

Another example of a situation in which a proxy may be desirable is a web cache. It may be desirable to store certain information that is available from a primary web site at a first IP address at a web cache located at another IP address. In this situation, the user is directed to the IP address of the web cache for the information, and, if the information requested is not found in the cache, then the web cache connects to the IP address of the first web site, obtains the information and then transfers it to the user.

FIG. 1 is a block diagram illustrating a proxied connection. A client 100 has an IP address of aaa.1. Client 100 wishes to obtain information from a server 102 that has an IP address bbb.1. Client 100, however, is not authorized to connect to server 102. Client 100 therefore must make a connection to a proxy 104 which has an IP address of xxx.1. Proxy 104 is authorized to make a connection to server 102.

In the example illustrated, client 100 connects to proxy 104 via the Internet 110. It should be noted that on other embodiments, the client connects to the proxy via some other internet or intranet. To connect to proxy 104 via the Internet, client 100 must know the IP address, xxx.1, of proxy 104 so that a connection can be made to proxy 104. Furthermore, client 100 must obtain authorization to log onto proxy 104. Usually, this is done by some sort of authentication or password procedure. Once client 100 has successfully logged on to proxy 104, client 100 may request proxy 104 to make a connection to server 102 and obtain data that is contained on server 102.

Once client 100 has successfully logged on to proxy 104, client 100 requests that the proxy establish a connection and log onto the server. The client sends datagrams or packets to the proxy and the proxy relays them to the server. It should be noted that in the following description the terms datagram and packet are used interchangeably to refer to messages or portions of messages sent to or from a network device. Generally, the client must also specify to the proxy the IP address of the server that it wishes to access so that the proxy can make a connection to the server. Once a connection with the server is established, then proxy 104 reads the data received from the client and relays the data to the server via the server connection. Likewise, the proxy reads the data received from the server and relays the data to the client via the client connection.

Typically, the client is required to log on to the proxy to get authorization to send information to the proxy to be relayed to the server and then the client must again log onto the server through the proxy. Although the proxy makes its own direct connection with the server which may require authentication of the proxy, the server in most cases will run a separate process to verify that the user of the proxy is authorized to get the information from the server that is being requested. Thus, the proxy protects the server from a direct connection with a hostile source, but the server still must ensure that the user of the proxy is authorized to obtain the requested information. If the same information is required by the proxy and the server, then the information often must be supplied twice, once during authentication to the proxy and once during authentication to the server. Thus, the client must know to request the proxy address and then go through two separate authentication procedures in order to successfully obtain information from the server.

Certain proxy programs simplify the process somewhat by allowing the client to provide both a proxy password and a server password in a single step when the client signs on to the proxy. In some instances, a single password is used for both the proxy and the server. Nevertheless, the client still must know to contact the proxy. As a result, when a proxy is changed, many separate client applications must often be reconfigured to contact the appropriate proxy.

The use of a proxy as described above requires the user to log onto the proxy at the proxy IP address. It is thus evident to the user that a proxy is being used. Furthermore, in some situations, the user is required to go through two separate security procedures, one to log onto the proxy, and a second to log onto the target machine or server. It would be desirable if a proxy could be provided that operated in a transparent manner so that the user would not be aware of the operation of the proxy and would not be required to go through two separate security procedures. Such a proxy would also eliminate the need to reconfigure a large number client applications when a proxy is changed.

SUMMARY OF THE INVENTION

Accordingly, the present invention provides a proxy that operates transparently. The proxy intercepts a connection request from a client to a server and establishes a connection with the client, acting on behalf of a server and for all purposes appearing to the client to be the server. Information requests from the client are relayed to the server and information from the server is relayed to the client by the proxy. The proxy inspects the data sent by the client and modifies it where appropriate. In some embodiments, the client need not log onto both the proxy and the server and it may in fact never be evident to the client that the connection is being proxied.

It should be appreciated that the present invention can be implemented in numerous ways, including as a process, an apparatus, a system, a device, a method, or a computer readable medium. Several inventive embodiments of the present invention are described below.

In one embodiment, a system and method are disclosed for transparently proxying a connection to a protected machine. The method includes monitoring a communication packet on a network at a proxy machine. The communication packet has a communication packet source address, a communication packet source port number, a communication packet destination address, and a communication packet destination port number. The proxy determines whether to intercept the communication packet based on whether the communication packet destination address and the communication packet destination port number correspond to a protected destination address and a protected destination port number stored in a proxy list. The proxy then determines whether to proxy a proxied connection associated with the communication packet based on the communication packet source address and the communication packet source port number. A protected connection is terminated from the proxy machine to a protected machine. The protected machine corresponds to the communication packet destination address and the communication packet destination port number. A response is formed to the communication packet under a network protocol by sending a responsive packet from the proxy machine. The responsive packet has a header having a responsive packet source address and a responsive packet source port number such that the responsive packet source address and the responsive packet source port number are the same as to the communication packet destination source address and the communication packet destination port number. Thus, the proxy machine terminates a protected connection to the protected machine and the proxy machine responds to the communication packet acting on behalf of the protected machine and the proxy machine appears to be the protected machine.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Figure 1:
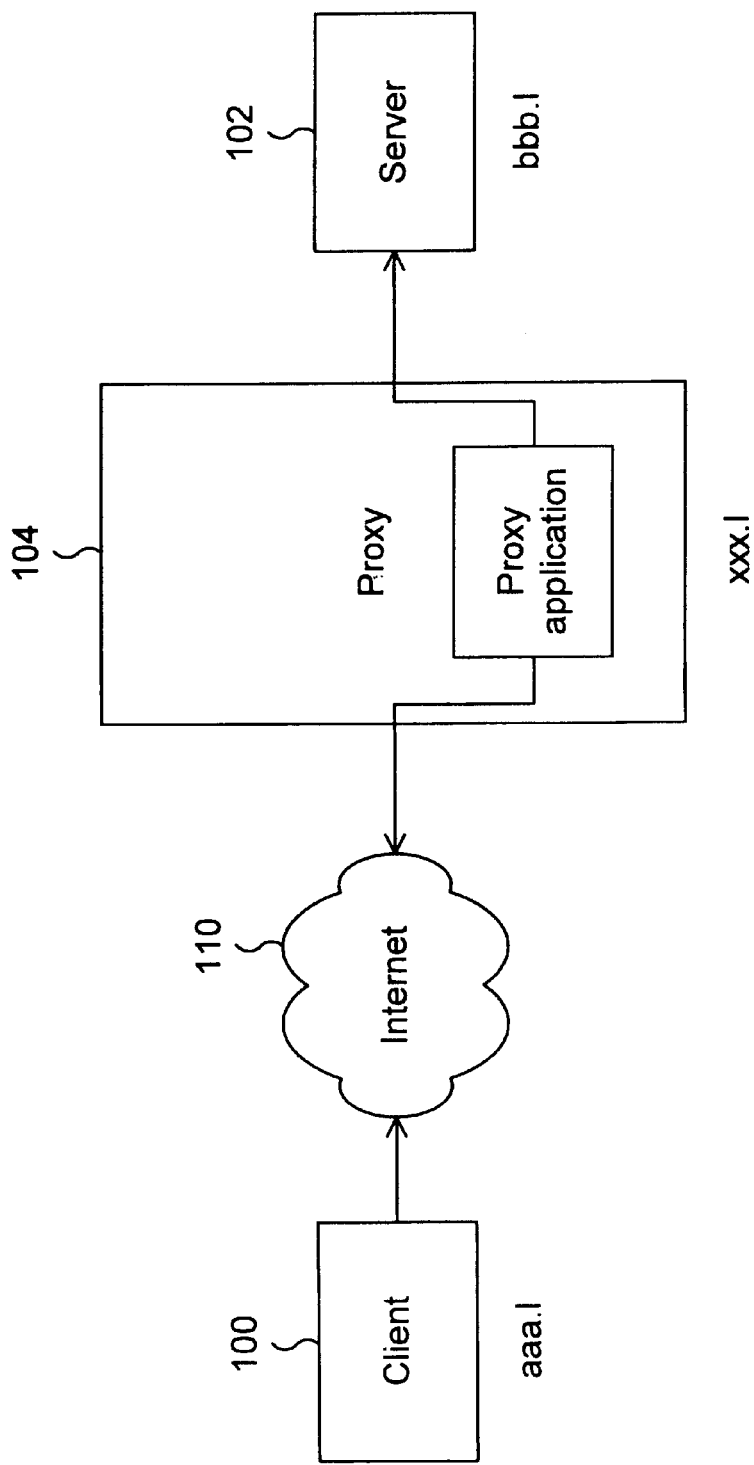
FIG. 1 is a block diagram illustrating a proxied connection.

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.
TCP/IP The present invention will be described as being implemented using TCP/IP. It should be recognized that other protocols such as UDP or IL may be used in other embodiments. TCP/IP was developed in the mid 1970s when the Defense Advanced Research Project Agency (DARPA) was interested in providing packet-switched network communications between the many research institutions in the United States. DARPA and other government organizations understood the potential of packet-switched technology and were just beginning to discover that virtually all companies with networks needed to support communication among dissimilar computer systems.

With the goal of heterogeneous connectivity in mind, DARPA funded research by Stanford University and Bolt, Beranek, and Newman to create a series of communication protocols. The result of that development effort, completed in the late 1970s, was the Internet protocol suite, of which the Transmission Control Protocol TCP) and the Internet Protocol (IP) are the two best-known members.

TCP

TCP is a connection-orientated transport layer protocol that sends data as an unstructured stream of bytes. By using sequence numbers and acknowledgment messages, TCP can provide a sending node with delivery information about packets transmitted to a destination node. Where data has been lost in transit from source to destination, TCP can retransmit the data until either a timeout condition is reached or until successful delivery has been achieved. TCP can also recognize duplicate messages and will discard them appropriately. If the sending computer is transmitting too fast for the receiving computer, TCP can employ flow control mechanisms to slow data transfer. TCP can also communicate delivery information to the upper-layer protocols and applications it supports. As a result of these capabilities, TCP is a connection oriented protocol. The information required for the sequencing, acknowledgment, and error correcting referred to above is stored and accessed by TCP in a data structure referred to as a Transmission Control Block (TCB).

IP

IP is the primary network layer protocol in the Internet suite. In addition to internetwork routing, IP provides error reporting and fragmentation and reassembly of information units called datagrams for transmission over networks with different maximum data unit sizes. IP represents the heart of the Internet protocol suite.

In the TCP/IP protocol, in order to properly route packets, it is necessary to use the source IP address and port number and the destination IP address and port number found in the packet header. These four quantities together will be referred to as a "quad". They will be stored at numerous points and accessed or modified in the system and method taught by the present invention in its various embodiments.

Network Environment and Network Devices

The system and method described herein may be usefully implemented on a number of network devices. Generally, the device on which the present invention is implemented will be referred to as a proxy or proxy machine. The present invention is useful in proxied applications that require a user to connect with a proxy machine that is different from the machine that holds the information that the user wants or to which the user otherwise wants to connect. A terminated connection is made to the proxy so that the proxy application can be run. Typically, the proxy application is some sort of security or authentication application, but in some embodiments the proxy application is some other initial application such as a web cache application that runs on a proxy machine. In a security application, the proxy machine authenticates the user and then passes information back and forth between the user and the server. In one embodiment, the present invention makes it possible for the user to log in only to the server. The transparent proxy intercepts the connection and it is not evident to the client that the machine running transparent proxy application even exists.

As noted above, the term proxy is used to refer to a device which terminates a connection from a client in the place of or as a proxy for another device which is the actual server or target for the client's connection request. In one embodiment, the present invention is implemented as a cut through transparent proxy whose existence and operation is not evident to the client such as is described in U.S. patent application Ser. No. 08/903,823, entitled Method and Apparatus for Reducing Overhead on a Proxied Connection, filed Jul. 31, 1997, now U.S. Pat. No. 6,006,268 issued on Dec. 21, 1999, which is herein incorporated by reference for all purposes.

In one embodiment, a transparent proxy is used to implement user authentication for a private internet exchange (PIX) that includes user authentication and security such as is described in U.S. patent application Ser. No. 08/552,807. It should also be noted a transparent proxy may be a PIX or other type of firewall or network address translation device, or a web server, web cache, or other network device. In some cases, the web server may be a multi-homed webserver. A PIX is a network device used to translate IP addresses. A PIX can be used to share a single IP address among a number of devices or as a firewall. When a connection is attempted from outside the network served by the PIX, it is often desirable to implement user authentication on the PIX so that the connection will not be made to a device on the network served by the PIX unless the user is authorized to make the connection. Thus, the user or client can log onto the PIX, terminate a connection with the PIX and the security application on the PIX is run to authenticate the user.

While reference will be made below to a proxy used as a network security device like the PIX that includes security functions, it should be noted that the cut through proxy may be implemented in other network devices such as a web server or web cache which may or may not include security functions.

When network security is implemented on a PIX implemented as a transparent proxy, once a single authentication is complete, then it has been determined that the user is authorized to establish the desired connection PIX and to obtain information from the server. The PIX intercepts a connection request from the client to the server and answers it as if the PIX were the server. Meanwhile, the PIX establishes a connection with the server. The PIX obtains all information needed to authenticate the user to use the PIX and to connect to the server by inspecting the data packets from the client and the server and modifying the data as required while maintaining state. If the PIX were implemented as a conventional proxy, then a separate login would be required for both the PIX and the server. Even if the authentication process were automated, applications must be configured to work with the proxy, connecting first to the proxy. Once authentication is complete, the PIX continues to inspect and modify packets as needed while keeping track of the state of the connection.

Figure 2:
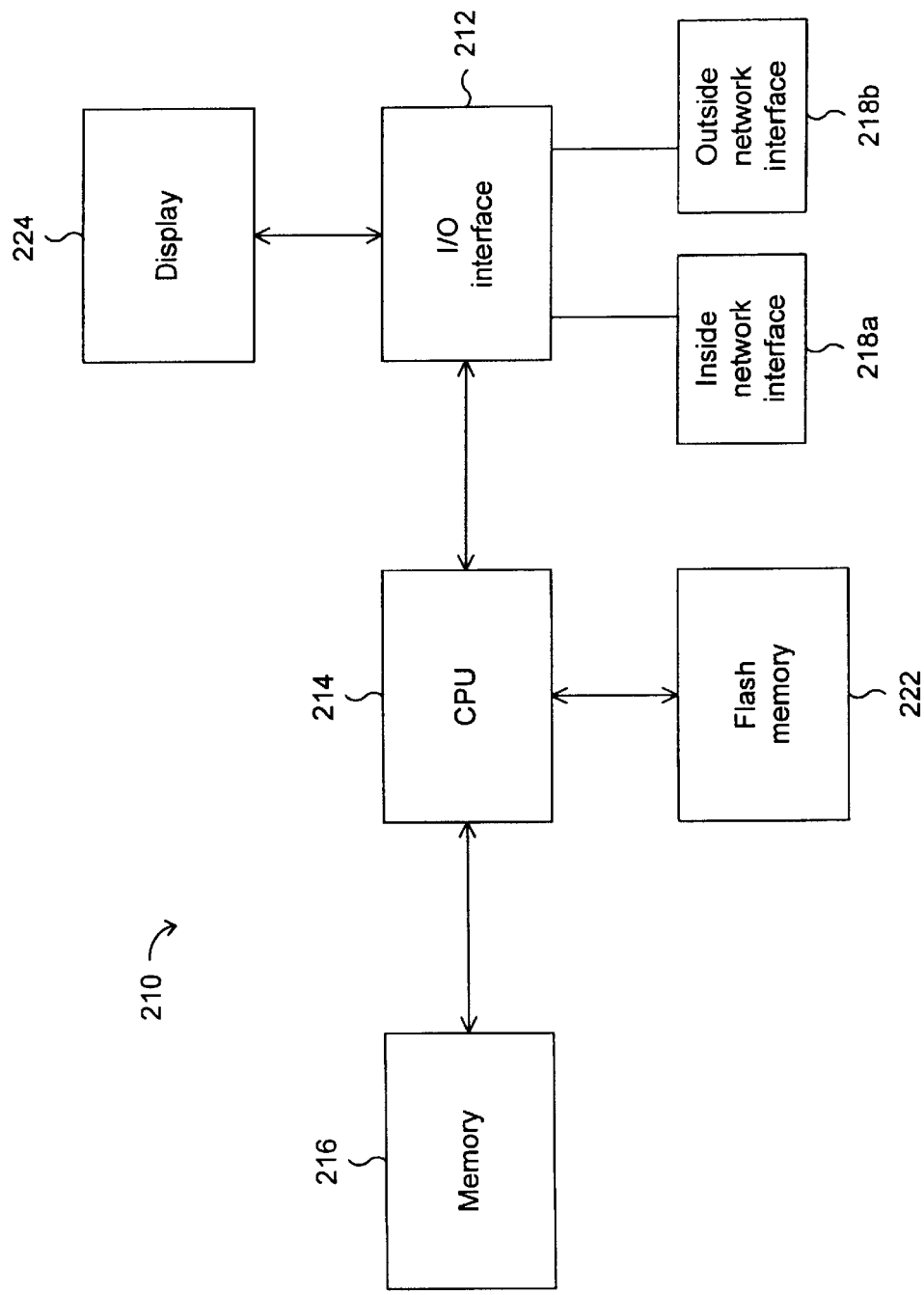
FIG. 2 shows a typical computer-based system which may be used as a transparent proxy.

FIG. 2 shows a typical computer-based system which may be used as a transparent proxy. Shown is a computer 210 which comprises an input/output circuit 212 used to communicate information in appropriately structured form to and from the parts of computer 210 and associated equipment, a central processing unit 214, and a memory 216. These components are those typically found in most general and special purpose computers 210 and are intended to be representative of this broad category of data processors.

Connected to the input/output circuit 212 are inside and outside high speed Local Area Network interfaces 218a and 218b. The inside interface 218a will be connected to a private network, while the outside interface 218b will be connected to an external network such as the Internet. Preferably, each of these interfaces includes (1) a plurality of ports appropriate for communication with the appropriate media, and (2) associated logic, and in some instances (3) memory. The associated logic may control such communications intensive tasks as packet integrity checking and media control and management. The high speed interfaces 218a and 218b are preferably multiport Ethernet interfaces, but may be other appropriate interfaces such as FDDI interfaces, etc.

The computer system may also include an input device (not shown) such as a keyboard. A flash memory device 222 is coupled to the input/output circuit 212 and provides additional storage capability for the computer 210. The flash memory device 222 may be used to store programs, data and the like and may be replaced with a magnetic storage medium or some other well known device. It will be appreciated that the information retained within the flash memory device 222, may, in appropriate cases, be incorporated in standard fashion into computer 210 as part of the memory 216.

In addition, a display monitor 224 is illustrated which is used to display the images being generated by the present invention. Such a display monitor 224 may take the form of any of several well-known varieties of cathode ray tube displays and flat panel displays or some other type of display.

Although the system shown in FIG. 2 is a preferred computer system of the present invention, the displayed computer architecture is by no means the only architecture on which the present invention can be implemented. For example, other types of interfaces and media could also be used with the computer.

Figure 3:
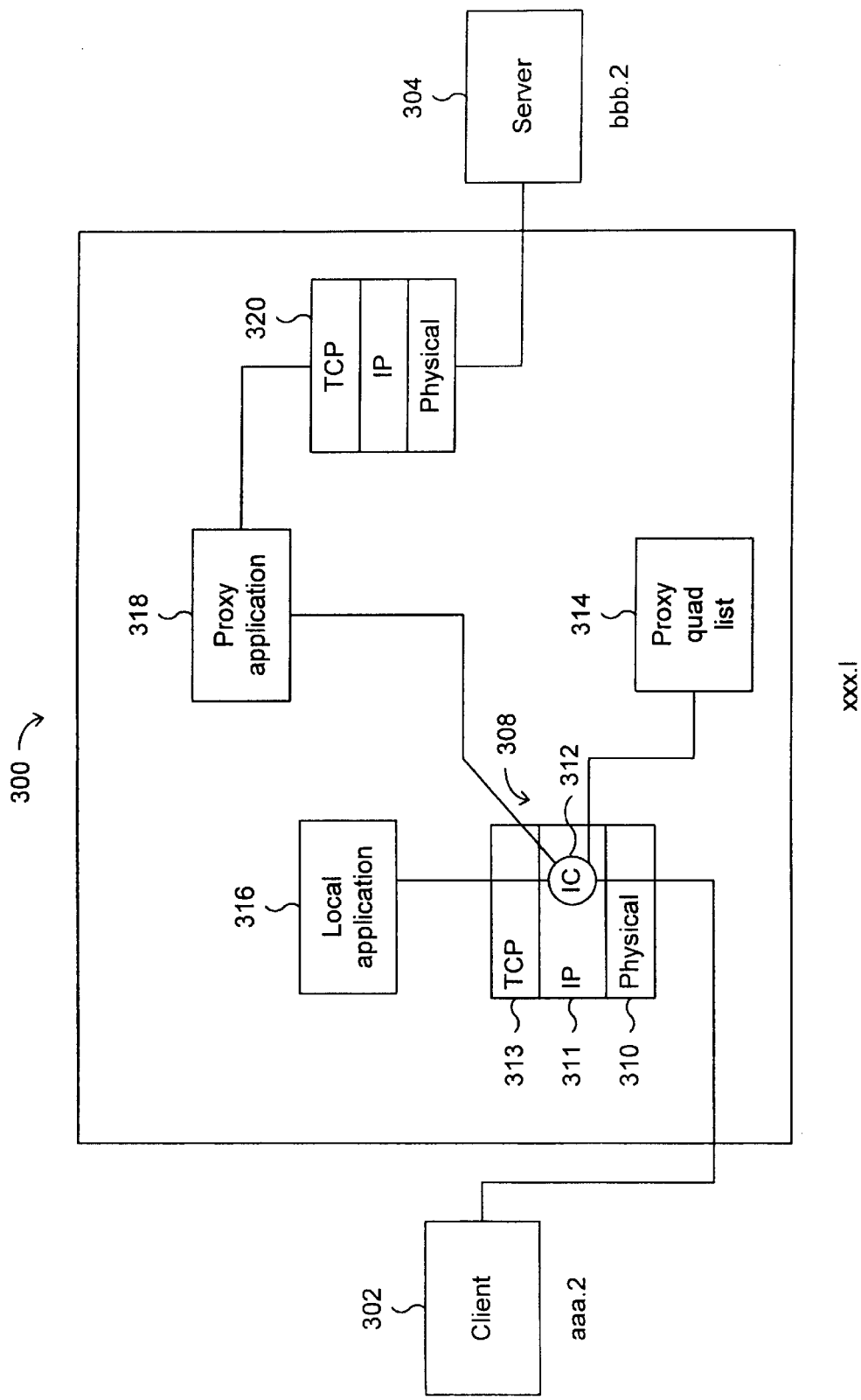
FIG. 3 is a block diagram of a transparent proxy at an IP address xxx.1 that proxies a connection from a client at an IP address aaa.2 to a server at IP address bbb.2.

FIG. 3 is a block diagram of a transparent proxy 300 at an IP address xxx.1 that proxies a connection from a client 302 at an IP address aaa.2 to a server 304 at IP address bbb.2. The transparent proxy proxies the connection between the client and the server without the client being aware of the fact that the connection is being proxied.

When client 302 desires to connect to server 304, client 302 sends a SYN packet to server 304 at the address bbb.2. Client 302 does not send a SYN packet to proxy 300, and, as noted above, client 302 may not even be aware of the existence of proxy 300. Proxy 300 is placed in the communications path of server 304 in a position to monitor all packets which are routed to server 304. Instead of acting as a proxy only when a connection is made to it, proxy 300 actively intercepts and reads all packets that are directed to client 302 that satisfy certain criteria as described below.

When a packet is received by the proxy from the communication path to the server, the packet is processed by a client network protocol stack 308 through a series of layers. The packet comes in through a physical layer 310. Typically, the physical layer implements Ethernet or some other well known protocol. Packets are passed up to an EP layer 311 and are processed according to the IP protocol. The TCP/IP protocol resolves the source IP address, the source port number, the destination IP address, and the destination port number, which are all found in the IP header. These four numbers will hereinafter be referred to as a "quad." Together, the numbers in the quad specify completely the source and destination of the packet.

In addition to the standard implementation of the IP protocol, the transparent proxy includes an intercepting controller 312 in the IP layer. In a conventional IP implementation, the IP protocol looks at the IP address of each incoming datagram and processes packets which have an IP address that corresponds to the IP address of the machine on which the protocol is running, without referring to the port number. In the transparent proxy, Intercepting controller 312 analyzes the quad (which includes the port number) of each incoming packet and compares the quad to a proxy quad list 314 which is accessible to the process running the modified IP layer protocol that includes the intercepting controller.

Intercepting controller 312 determines whether the incoming packet should be routed to a local application 316 which processes incoming packets intended to communicate directly with the proxy itself. Intercepting controller 312 also determines whether the incoming packet corresponds to a proxied connection, whether the incoming packet is a SYN packet that corresponds to a new connection that should be added to the proxy quad list, or whether the packet should be dropped. If the packet corresponds to a proxied connection, it's data is read and relayed to a server network protocol stack 320 that manages a connection with server 304.

Thus the intercepting controller intercepts packets for either local application 316 or proxy application 318. Both types of packet are sent up through the TCP layer 313. The TCP application hashes the quad and looks up the result in a hash table. The packet is then sent to the application socket that is found in the hash table. An application reads and writes data to the socket. Thus, the IC routes packets sent to the proxy application and proxied packets to the TCP layer. The TCP layer routes each packet to the appropriate socket for the packet.

Intercepting controller 312 further determines whether to drop packets for certain connections which do not have a destination IP address number corresponding to the proxy and which are not found in the proxy quad list. Thus, intercepting controller filters out packets that are not to be sent to the server or directly to the proxy so that the TCP process does not need to set up a TCB or devote processing time to such packets. Data from such packets is not passed to the proxy application and is not relayed to server 304. It should be noted that, although only one server is shown being proxied in FIG. 3, in most applications, the proxy will function as a proxy for multiple servers at the same time receiving connections from many clients. Also, intercepting controller 312 acts as a filter to prevent new proxied connections from being established for SYN packets which do not come from an authorized source.

Security is implemented both in the intercepting controller and in the proxy application. The intercepting controller filters packets from unauthorized sources and the proxy application checks the contents of packets. Proxy application 318 also performs an additional security function of authenticating the user and authorizing the proxied connection in the first place. As noted above, authentication by the proxy application for the purpose of authorizing access to the proxy is performed at the same time as authentication by the server in some embodiments. Thus, bad packets are filtered both by the intercepting controller residing in the IP layer based on the sender IP address and port number of the packet and bad packets are also eliminated in the proxy application based on their content. Packets which are determined to come from an authorized source are read and their data is forwarded, and, in some embodiments, modified where appropriate by the proxy application. Packets are forwarded to the server via a connection made with the server using server network stack 320.

Thus, intercepting controller 312 is provided as part of a modified IP layer of proxy 300 that processes incoming packets intended for server 304. Intercepting controller 312 filters packets based on the proxy quad list. Packets which have an appropriate source IP address and port number are sent to proxy application 318 where further security or authentication may be implemented. Data from packets which pass authentication by proxy application 318 is forwarded by the proxy application to the server network stack. The server network stack manages the relay of the data from proxy application 318 to server 304. Note that client 302 sends packets to the server IP address, not to the IP address of the proxy. The proxy intercepts those packets and forwards data from the packets to the server if appropriate.

Figure 4:
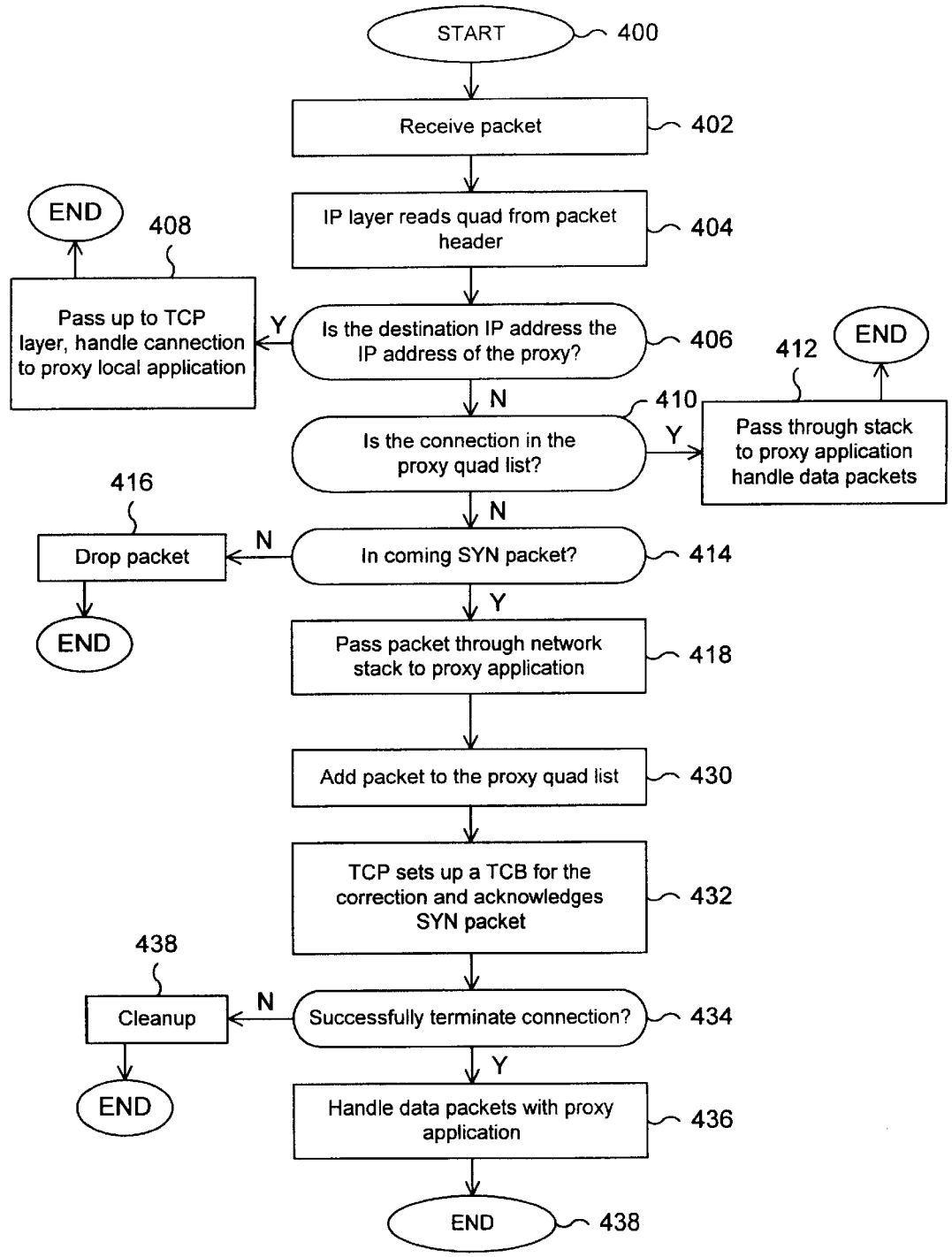
FIG. 4 is a process flow diagram illustrating a process implemented on a proxy for routing packets received from client as shown in FIG. 3.

FIG. 4 is a process flow diagram illustrating a process implemented on proxy 300 for routing packets received from client 302 as shown in FIG. 3. The process starts at 400. In step 402, the proxy receives a packet and the packet is routed through the network layer to the modified IP layer. Next, in a step 404, the modified IP layer reads the quad from the packet header. The intercepting controller checks in a step 406 whether the destination IP address is the address of the proxy. If it is, then control is transferred to a step 408 and the packet is passed up to the TCP layer. It should be noted that in some embodiments both the destination and the port number of the packet is checked to determine whether it should be routed to the proxy local application. The connection is handled according to the TCP protocol and the data is sent to the proxy local application. The purpose of this path is to enable communication to be made on the network directly to the proxy itself. Once the connection is handled and data is processed by the proxy local application, the process ends until another packet is received.

If the destination IP address of the packet is not the IP address of the proxy, then control is transferred to a step 410. In step 410, the proxy quad list is checked to determine whether the quad corresponds to a connection that is being proxied. If it is, then the packet is passed up through the client network stack to the proxy application and the proxy application handles the data packet in a step 412, forwarding data to the server as appropriate. Step 412 is described in greater detail in FIG. 8. Once this is done the process ends for that data packet and the system continues to handle other data packets as they are received. If the connection is not in the proxy quad list, then control is transferred to a step 414 which determines whether or not the packet is an incoming SYN packet. If it is not a SYN packet, control is transferred to a step 416 and the packet is dropped and the process ends for that packet. In some embodiments, an error message or a reset may be sent to the client.

If the packet is an incoming SYN packet, then control is transferred to a step 418 and the packet is passed through the network stack to the proxy application. A TCB is set up for the connection and the quad is hashed and added to the hash table so that the intercepting controller can hash the quad for subsequent packets and send them to the TCP layer. In some embodiments, user authentication may be required before the proxy application will open the second connection to the server. In other embodiment, the proxy opens a connection to the server as soon as the client connection is terminated.

In a step 430, the packet is added to the proxy quad list. In a step 432, the TCP layer of the client network stack sets up a TCB for the connection and acknowledges the SYN packet so that the connection is terminated by TCP. If the connection is terminated successfully, then control is transferred by a step 434 to a step 436 and data packets are handled with the proxy application and relayed to the server if appropriate. Data packets are handled by the proxy until the connection is closed and then the process ends. If the connection is not terminated successfully, then control is transferred to a step 438 where the TCB is cleaned up and the process ends.

Thus, an incoming packet is first checked to see whether it is sent directly to the proxy. If it is, then the packet is handled by the proxy local application. If the packet is not to be handled by the proxy, then the intercepting controller determines whether or not the packet corresponds to a connection that is listed in the proxy quad list. If it is, then the packet is proxied and the proxy application determines whether to relay data to the client. If the quad on the packet header is not found in the proxy quad list, then, if the packet is an incoming SYN packet, the intercepting controller passes the packet through the network stack to the proxy application where a determination is made whether or not to add the connection to the proxy quad list. If the connection is added, then the connection is terminated and data from the connection is processed by the proxy application. If the proxy application determines that data should be relayed to the server, then data is passed from the socket on the client side to the socket on the server side corresponding to the terminated connection between the proxy and the server.

Figure 5:
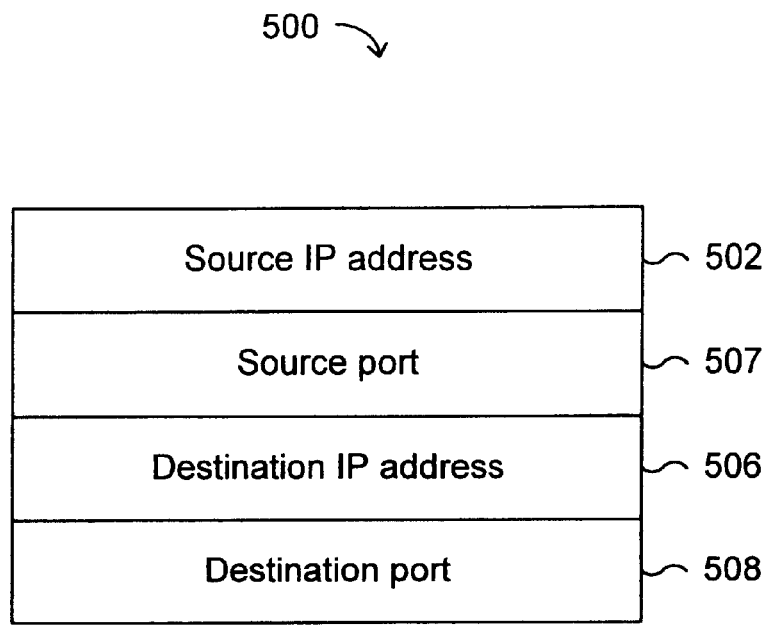
FIG. 5 is a block diagram illustrating the data structure contained in the proxy quad list.

FIG. 5 is a block diagram illustrating the data structure contained in the proxy quad list. As described above, the proxy quad list is accessed by the intercepting controller for the purpose of determining how to handle incoming data packets. Each quad in the proxy quad list is stored as a quad object 500. The quad contains a source IP address 502, a source port 504, a destination IP address 506 and a destination port 508. In one embodiment, the proxy list quads objects are stored in a hash table. In other embodiments, the objects may be stored in a link list, each object containing a pointer to the next object or some other data structure. It should be noted that other data base structures containing the fields corresponding to the quad numbers can also be implemented in other embodiments.

Figure 6:
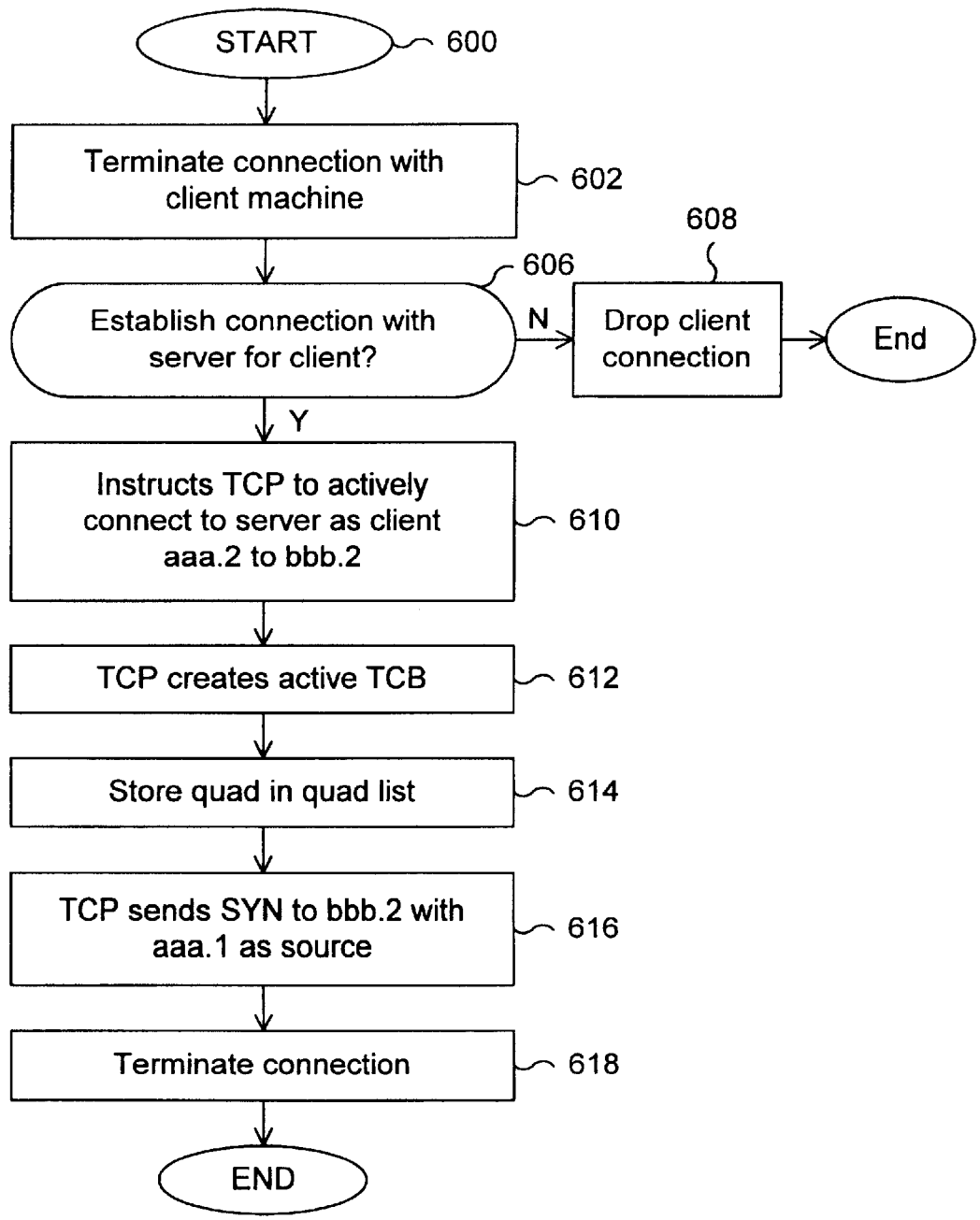
FIG. 6 is a process flow diagram illustrating the process for determining whether to establish an outgoing connection and establishing an outgoing connection with the server so that data from packets intercepted from clients to be proxied can be transferred to the server.

FIG. 6 is a process flow diagram illustrating the process for determining whether to establish an outgoing connection and establishing an outgoing connection with the server so that data from packets intercepted from clients to be proxied can be transferred to the server. The process starts at 600. In a step 602, a connection is terminated with the client, with the proxy pretending to be the server. The proxy replies to the client's packets by sending packets that give the server's IP address and port number in the packet IP header. As described above in connection with FIG. 4, this is done if a SYN packet is intercepted on its way to the client from a source that is authorized to use the proxy but not authorized to connect directly to the client.

In a step 606, the proxy application decides whether to open a connection to the server. In some embodiments, the proxy may open a connection to the server immediately. In other embodiments, some preliminary authorization procedure is completed first that does not require information from the server. If the proxy application decides not to proxy the connection, then the connection is dropped in a step 608 and the process ends. If the proxy application decides to proxy the connection, then control is transferred to a step 610 and the proxy application sends instructions to the TCP block in the server network stack to actively connect as the client to the server.

In a step 612, TCP creates an active TCB. In a step 614, the quad for the connection is stored in a quad list. In a step 616, TCP sends a SYN packet to the server with the client IP address and port number named as the source IP address and the port number. In a step 618, the connection is terminated with the server and the proxy application relays data received from the client to the server using the server connection.

Figure 7:
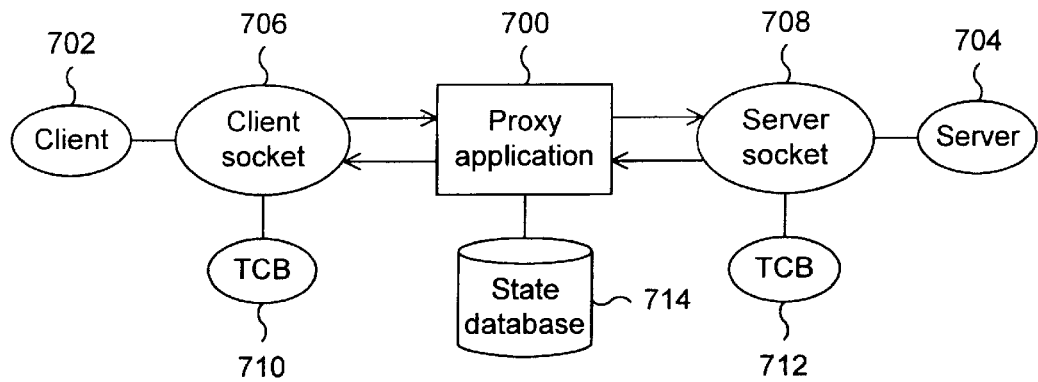
FIG. 7 is a block diagram illustrating how a transparent proxy handles a proxied collection between a client and a server.

FIG. 7 is a block diagram illustrating how a transparent proxy 700 handles a proxied connection between a client 702 and a server 704. Once the proxy application has terminated a connection with both the client and the server, data is received from a client socket 706 and relayed to server socket 708. Likewise data is received from server socket 708 and relayed to client socket 706. The proxy maintains a TCB 710 to manage the connection with the client using TCP and a TCB 712 to manage the connection with the server using TCP. Data in packets from both the client and the server is read by the proxy. The proxy maintains state information about the client and server connections in an event database 714, where events such as a remote close request for one of the sockets or an error are stored. This information is used to determine whether to forward packets. The proxy also determines whether to modify the data before transferring it from one socket to the other.

Figure 8:
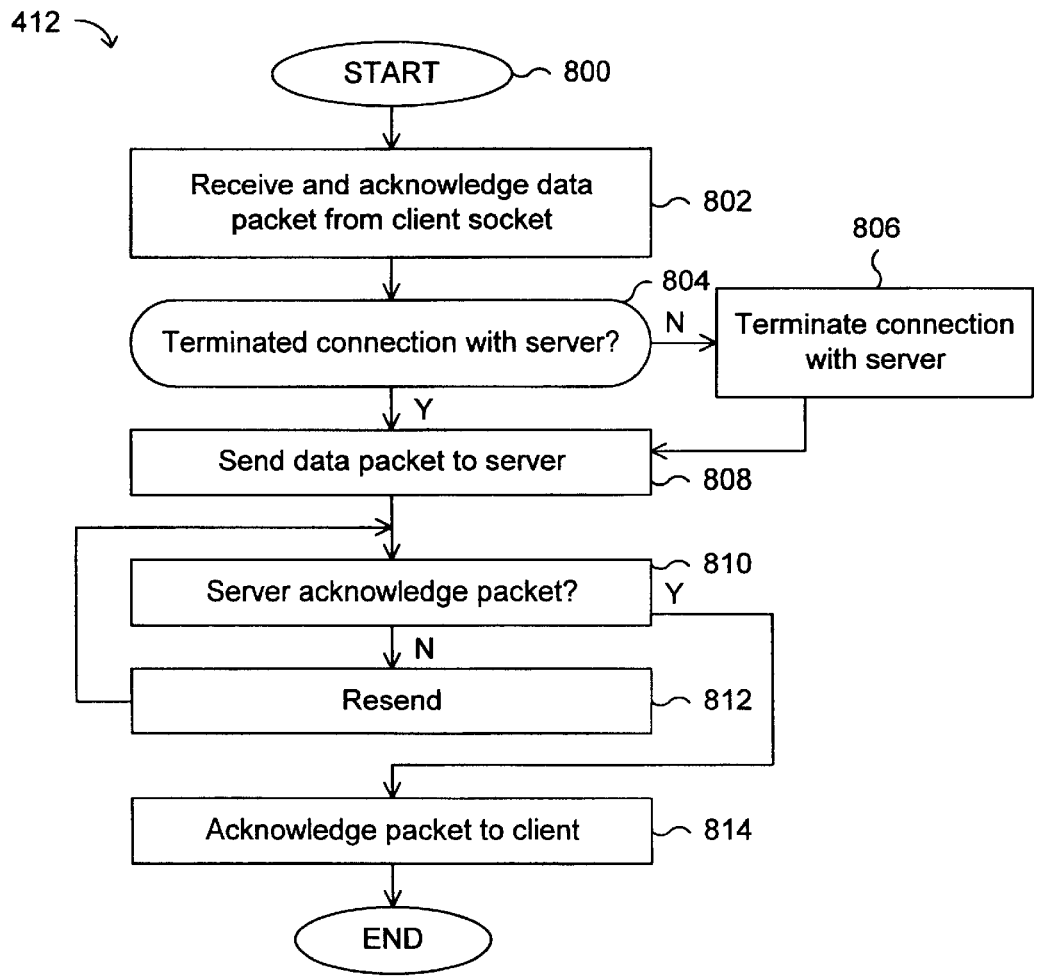
FIG. 8 is a process flow diagram illustrating in detail the process implemented by the proxy for handling data packets which are relayed to the server.

FIG. 8 is a process flow diagram illustrating in detail the process implemented by the proxy for handling data packets which are relayed to the server as shown in step 412 of FIG. 4. The process starts at 800. In a step 802, the proxy application receives a data packet from the client socket and acknowledges the packet to the client. The IP header of the packet contains a quad which is in the proxy list and so the data packet was forwarded to the proxy application for relay to the server. Next, in a step 804, the proxy checks to see if there is a terminated connection with the server. If there is not a terminated connection, then control is transferred to a step 806 and the connection is terminated with the server. Control is then transferred to a step 808 and the data packet is sent to the server. Next, in a step 810 the TCP portion of the server network stack checks whether the server acknowledges the packet. If the server does not acknowledge, then the packet is resent in a step 812.

Once the server acknowledges the packet, control is transferred to a step 814 and then the proxy application updates the state of the proxied connection to reflect the fact that the packet has been successfully forwarded. In one embodiment, if a packet is not successfully forwarded, then the proxy application notifies the application layer of the machine that sent the packet that the packet was not properly received or was not properly processed. For example, if the server were down and not acknowledging the relayed packets, then the proxy may notify the server by sending a message that appears to the server to come from the client application. The process then ends.

Once the process illustrated in FIG. 8 has been completed, the data packet sent from the client to the server has been intercepted by the proxy. The data has been read and acknowledged, and the data has been forwarded to the server with an IP header that appears as if the data came from the client. It appears to the client that the acknowledgment of the packet came from the server. When the server acknowledges the data packet, the proxy application receives the acknowledgment.

Figure 9:
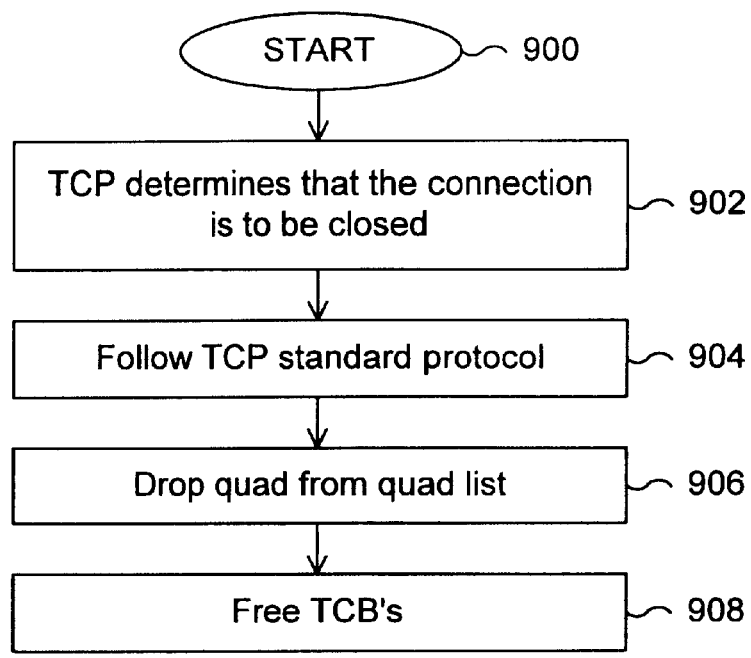
FIG. 9 is a process flow diagram illustrating the process for closing a connection.

FIG. 9 is a process flow diagram illustrating the process for closing a connection. The process starts at 900. In a step 902, TCP determines that the connection is to be closed. This can be due to an error or a remote machine closing the connection or the proxy closing the connection. Next, in a step 904, the TCP standard protocol for closing a connection is followed. That is, a FIN packet is sent, a FIN ACK is received, and a final ACK packet is sent. Once the connection is closed, the quad corresponding to the client is dropped from the quad list in a step 906 and the TCB's associated with the client connection and the server connection are freed in a step 908.

Thus, a transparent proxy has been described which intercepts packets sent to the IP address of a server and determines whether the quad of the packet corresponds to a connection that is all ready being proxied, or, if the packet is a SYN packet, whether the quad corresponds to a quad that is a candidate for being proxied. If the quad is a candidate for being proxied then the packet is transferred to the proxy application and the proxy application determines whether or not to create a proxied connection. When a proxied connection is created, then the quad is added to the proxy quad list and subsequent data from data packets for that connection are forwarded to the server.

The process of proxying a connection can be described in phases. In the first phase, the proxy pretends to be the destination and acknowledges the first SYN packet. In a second phase, the proxy application determines whether it wants to continue the connection. This involves authentication of the client. A connection with the server may be set up at that point so that authentication with the server and the proxy are part of the same process. In a third phase, if the proxy application decides to continue the connection, then a second connection is terminated with the server. Finally, in the fourth phase, data from the client is relayed to the server and vice versa.

Although the foregoing invention has been described in some detail for purposes of clarity of understanding, it will be apparent that certain changes and modifications may be practiced within the scope of the appended claims. It should be noted that there are may alternative ways of implementing both the process and apparatus of the present invention. For example, as noted above, the present invention is implemented on a PIX in one embodiment. In other embodiments, the present invention is implemented on another fire wall or a multihomed web server. Accordingly, the present embodiments are to be considered as illustrative and not restrictive, and the invention is not to be limited to the details given herein, but may be modified within the scope and equivalents of the appended claims.

What is claimed is:

1. A method of transparently proxying a connection to a protected machine comprising:

intercepting at a proxy machine a communication packet directed to the protected machine, the communication packet comprising a communication packet source address, a communication packet source port number, a communication packet destination address, and a communication packet destination port number, the communication packet not being addressed to the proxy machine by the originator of the communication packet under any network communication protocol;

determining to proxy a proxied connection associated with the communication packet based on the communication packet source address and the communication packet source port number; and terminating a protected connection from the proxy machine to the protected machine, the protected machine corresponding to the communication packet destination address and the communication packet destination port number, each communication sent from the proxy machine to the protected machine as part of the protected connection comprising a header in which the source address and the source port number are the same as the communication packet source address and the communication packet source port number.

2. A method of transparently proxying a connection to a protected machine as recited in claim 1, further comprising:
determining to intercept the communication packet at the proxy machine based on whether the communication packet destination address and the communication packet destination port number correspond to a protected destination address and a protected destination port number stored in a proxy list.

3. A method of transparently proxying a connection to a protected machine as recited in claim 1, further comprising:
forming a response to the communication packet under a network protocol by sending a responsive packet from the proxy machine wherein the responsive packet has a header having a responsive packet source address and a responsive packet source port number wherein the responsive packet source address and the responsive packet source port number are the same as to the communication packet destination address and the communication packet destination port number;
whereby the proxy machine terminates a protected connection to the protected machine and the proxy machine responds to the communication packet acting on behalf of the protected machine and the proxy machine appears to be the protected machine.

4. A method of transparently proxying a connection to a protected machine as recited in claim 1, wherein the protected machine has a protected machine IP address and the protected machine IP address is the same address as the communication packet destination address.

5. A method of transparently proxying a connection to a protected machine as recited in claim 1 wherein the communication packet is a SYN packet.

6. A method of transparently proxying a connection to a protected machine as recited in claim 1 wherein the proxy machine terminates an outside connection with an outside machine, the outside machine being the sender of the communication packet.

7. A method of transparently proxying a connection to a protected machine as recited in claim 6 wherein the proxy machine pretends to be the protected machine on the outside connection.

8. A method of transparently proxying a connection to a protected machine as recited in claim 7 wherein the proxy machine includes the protected machine IP address as the source address in packets that are sent from the proxy machine to the outside machine.

9. A method of transparently proxying a connection to a protected machine as recited in claim 6 further including receiving on the outside connection an outside data packet containing outside data from the outside machine, reading the outside data at the proxy machine, and relaying the outside data to the protected machine via a socket corresponding to the protected connection.

10. A method of transparently proxying a connection to a protected machine as recited in claim 9 further including modifying the outside data at the proxy machine.

11. A method of transparently proxying a connection to a protected as recited in claim 9 further comprising modifying the protected data at the proxy machine.

12. A method of transparently proxying a connection to a protected machine as recited in claim 9 further including receiving on the protected connection a protected data packet containing protected data from the protected machine, reading the protected data at the proxy machine, and relaying the protected data to the outside machine via a socket corresponding to the outside connection.

13. A method of transparently proxying a connection to a protected machine as recited in claim 9 wherein the outside data is used to authenticate the outside machine to the protected machine.

14. A method of transparently proxying a connection to a protected machine as recited in claim 9 further comprising requesting and obtaining from the protected machine data that is responsive to the outside data.

15. A method of transparently proxying a connection to a protected machine as recited in claim 1 further comprising receiving on the protected connection a protected data packet containing protected data from the protected machine, reading the protected data on the proxy machine, and relaying the protected data to the outside machine.

16. A method of transparently proxying a connection to a protected as recited in claim 15, wherein the protected data comprises an authentication request.

17. A method of transparently proxying a connection to a protected machine as recited in claim 1 wherein the proxy machine is a web server.

18. A method of transparently proxying a connection to a protected machine as recited in claim 1 wherein the proxy machine is a PIX.

19. A method of transparently proxying a connection to a protected machine as recited in claim 1 wherein the proxy machine is a firewall.

20. A method of transparently proxying a connection to a protected machine as recited in claim 1 wherein an intercepting controller determines whether to direct the communication packet to a local application or a proxy application or to drop communication packet based on a proxy quad list.

21. A method of transparently proxying a connection to a protected machine as recited in claim 1 wherein the communication packet is sent under the TCP network protocol.

22. A method of transparently proxying a connection to a protected machine comprising:
intercepting a communication packet on a network at a proxy machine, the communication packet comprising a communication packet source address, a communication packet source port number, a communication packet destination address, and a communication packet destination port number, the communication packet not being addressed to the proxy machine by the originator of the communication packet under any network communication protocol;
determining to proxy a proxied connection associated with the communication packet based on the communication packet source address and the communication packet source port number;
terminating a protected connection from the proxy machine to the protected machine, the protected machine corresponding to the communication packet destination address and the communication packet destination port number, each communication sent from the proxy machine to the protected machine under the protected connection comprising a header in which the source address and the source port number are the same as the communication packet source address and the communication packet source port number;
forming a response to the communication packet under a network protocol by sending a responsive packet from the proxy machine wherein the responsive packet comprises a header having a responsive packet source address and a responsive packet source port number wherein the responsive packet source address and the responsive packet source port number are the same as to the communication packet destination address and the communication packet destination port number;

receiving on an outside connection an outside data packet containing outside data from an outside machine, the outside machine being the sender of the communication packet, reading the outside data at the proxy machine, and relaying the outside data to the protected machine via a socket corresponding to the protected connection; and acknowledging the receipt of the outside data packet at the proxy machine after a protected machine acknowledges receipt of data contained in the outside data packet;

whereby the proxy machine terminates a protected connection to the protected machine and the proxy machine responds to the communication packet acting on behalf of the protected machine and the proxy machine appears to be the protected machine.

23. A proxy system for proxying a connection from an outside machine to a protected machine comprising:

an outside connection stack, the outside connection stack being operative to establish an outside connection to the outside machine;

a proxy quad list, the proxy quad list containing a list of proxied connections;

an intercepting controller, the intercepting controller being operative to read incoming data packets, to resolve IP addresses and port numbers to determine whether the data packets correspond to a proxied connection based on the proxy quad list; and a proxy application, the proxy application being operative to:
  determine whether a new connection should be added to the quad list; and
  if it is determined that a new connection should be added to the quad list, to add the new connection to the quad list;

wherein the proxy application is configured to establish and maintain a proxy connection to the protected machine by sending to the protected machine communications packets comprising a header in which the source address and the source port number are the same as the source address and the source port number of the incoming data packet(s) associated with the proxied connection.

24. A proxy system for proxying a connection from an outside machine to a protected machine as recited in claim 23, wherein the proxy application is further operative to:

form a response to an incoming packet under a network protocol by sending a responsive packet from the proxy system wherein the responsive packet has a header having a responsive packet source address and a responsive packet source port number wherein the responsive packet source address and the responsive packet source port number are the same as to the incoming packet destination address and the incoming packet destination port number, the incoming packet destination address and the incoming packet destination port number being associated with the protected machine;

whereby the proxy system terminates a protected connection to the protected machine and the proxy system responds to the incoming packet acting on behalf of the protected machine and the proxy system appears to be the protected machine.

25. A proxy system for proxying a connection from an outside machine to a protected machine as recited in claim 23, wherein the proxy quad list comprises for each proxied connection an outside machine address, an outside machine port number, a protected machine address, and a protected machine port number.

26. A proxy system for proxying a connection from an outside machine to a protected machine as recited in claim 25, wherein the intercepting controller determines whether a received data packet corresponds to a proxied connection based on the proxy quad list by determining whether the source address, source port number, destination address, and destination port number of the received data packet correspond to an entry in the proxy quad list.

27. A proxy system for proxying a connection from an outside machine to a protected machine comprising:

means for intercepting at a proxy machine a communication packet directed to the protected machine, the communication packet comprising a communication packet source address, a communication packet source port number, a communication packet destination address, and a communication packet destination port number, the communication packet not being addressed to the proxy machine by the originator of the communication packet under any network communication protocol;

means for determining to proxy a proxied connection associated with the communication packet based on the communication packet source address and the communication packet source port number; and means for terminating a protected connection from the proxy machine to the protected machine, the protected machine corresponding to the communication packet destination address and the communication packet destination port number, each communication sent from the proxy machine to the protected machine as part of the protected connection comprising a header in which the source address and the source port number are the same as the communication packet source address and the communication packet source port number.

28. A computer program product for transparently proxying a connection to a protected machine, the computer program product being embodied in a computer readable medium and comprising computer instructions for:

intercepting at a proxy machine a communication packet directed to the protected machine, the communication packet comprising a communication packet source address, a communication packet source port number, a communication packet destination address, and a communication packet destination port number, the communication packet not being addressed to the proxy machine by the originator of the communication packet under any network communication protocol;

determining to proxy a proxied connection associated with the communication packet based on the communication packet source address and the communication packet source port number; and terminating a protected connection from the proxy machine to the protected machine, the protected machine corresponding to the communication packet destination address and the communication packet destination port number, each communication sent from the proxy machine to the protected machine as part of the protected connection comprising a header in which the source address and the source port number are the same as the communication packet source address and the communication packet source port number.

29. A computer program product as recited in claim 28, further comprising computer instructions for:

determining to intercept the communication packet at the proxy machine based on whether the communication packet destination address and the communication packet destination port number correspond to a protected destination address and a protected destination port number stored in a proxy list.

30. A computer program product as recited in claim 28, further comprising computer instructions for:

forming a response to the communication packet under a network protocol by sending a responsive packet from the proxy machine wherein the responsive packet has a header having a responsive packet source address and a responsive packet source port number wherein the responsive packet source address and the responsive packet source port number are the same as to the communication packet destination address and the communication packet destination port number;

whereby the proxy machine terminates a protected connection to the protected machine and the proxy machine responds to the communication packet acting on behalf of the protected machine and the proxy machine appears to be the protected machine.

31. A computer program product as recited in claim 28, wherein the protected machine has a protected machine IP address and the protected machine IP address is the same address as the communication packet destination address.

32. A computer program product as recited in claim 28, wherein the communication packet is a SYN packet.

33. A computer program product as recited in claim 28, further comprising computer instructions for terminating an outside connection with an outside machine, the outside machine being the sender of the communication packet.

34. A computer program product as recited in claim 28, wherein the proxy machine pretends to be the protected machine on the outside connection.

35. A computer program product as recited in claim 28, wherein the proxy machine includes the protected machine IP address as the source address in packets that are sent from the proxy machine to the outside machine.

36. A computer program product as recited in claim 28, further comprising computer instructions for receiving on the outside connection an outside data packet containing outside data from the outside machine, reading the outside data at the proxy machine, and relaying the outside data to the protected machine via a socket corresponding to the protected connection.

37. A computer program product as recited in claim 36, further comprising computer instructions for modifying the outside data at the proxy machine.

38. A computer program product as recited in claim 36, further comprising computer instructions for modifying the protected data at the proxy machine.

39. A computer program product as recited in claim 36, further comprising computer instructions for receiving on the protected connection a protected data packet containing protected data from the protected machine, reading the protected data at the proxy machine, and relaying the protected data to the outside machine via a socket corresponding to the outside connection.

40. A computer program product as recited in claim 36, wherein the outside data is used to authenticate the outside machine to the protected machine.

41. A computer program product as recited in claim 36, further comprising computer instructions for requesting and obtaining from the protected machine data that is responsive to the outside data.

42. A computer program product as recited in claim 28, further comprising computer instructions for receiving on the protected connection a protected data packet containing protected data from the protected machine, reading the protected data on the proxy machine, and relaying the protected data to the outside machine.

43. A computer program product as recited in claim 42, wherein the protected data comprises an authentication request.

44. A computer program product as recited in claim 28, wherein the proxy machine is a web server.

45. A computer program product as recited in claim 28, wherein the proxy machine is a PIX.

46. A computer program product as recited in claim 28, wherein the proxy machine is a firewall.

47. A computer program product as recited in claim 28, further comprising computer instructions for determining whether to direct the communication packet to a local application or a proxy application or to drop the communication packet based on a proxy quad list.

48. A computer program product as recited in claim 28, wherein the communication packet is sent under the TCP network protocol.

* * * * *

UNITED STATES PATENT AND TRADEMARK OFFICE
CERTIFICATE OF CORRECTION

PATENT NO. : 6,894,981 B1
APPLICATION NO. : 10/027227
DATED : May 17, 2005
INVENTOR(S) : Coile et al.

It is certified that error appears in the above-identified patent and that said Letters Patent is hereby corrected as shown below:

Column 13, Line 62, after "protected" insert -- machine --.
Column 14, Line 19, after "protected" insert -- machine --.
Column 14, Line 34, after "drop" insert -- the --.

Signed and Sealed this

Fifth Day of December, 2006

JON W. DUDAS
*Director of the United States Patent and Trademark Office*